(12) United States Patent
Stephens et al.

(10) Patent No.: US 8,197,031 B2
(45) Date of Patent: Jun. 12, 2012

(54) FLUID DISPENSING SUBASSEMBLY WITH POLYMER LAYER

(75) Inventors: Terrance L. Stephens, Molalla, OR (US); John R. Andrews, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 438 days.

(21) Appl. No.: 12/471,137

(22) Filed: May 22, 2009

(65) Prior Publication Data
US 2010/0295901 A1 Nov. 25, 2010

(51) Int. Cl.
*B41J 2/04* (2006.01)
(52) U.S. Cl. .......................................... 347/54; 347/68
(58) Field of Classification Search .................. 347/54, 347/68, 70–72
See application file for complete search history.

(56) References Cited

U.S. PATENT DOCUMENTS

| | | | |
|---|---|---|---|
| 5,790,156 A * | 8/1998 | Mutton et al. | 347/71 |
| 6,932,464 B2 * | 8/2005 | Tanikawa et al. | 347/71 |
| 7,246,889 B2 * | 7/2007 | Kanada et al. | 347/71 |
| 7,348,715 B2 * | 3/2008 | Torii et al. | 347/68 |

* cited by examiner

*Primary Examiner* — Juanita D Jackson
(74) *Attorney, Agent, or Firm* — Marger Johnson & McCollom PC

(57) ABSTRACT

A fluid dispensing subassembly has a diaphragm arranged to be operated on by a transducer, a body pressure chamber arranged to be operated on by the diaphragm, and an adhesive attachment layer arranged between the diaphragm and the body pressure chamber. A fluid dispensing subassembly has a body pressure chamber formed of either a single plate or set of plates, a diaphragm arranged to operate on the body pressure chamber, and an adhesive layer arranged between the body pressure chamber and the diaphragm. A method of manufacturing a fluid dispensing subassembly includes forming a body pressure chamber from a body plate or a set of plates including a body plate, and adhesively bonding a diaphragm plate to at least the body plate of the fluid dispensing subassembly.

13 Claims, 3 Drawing Sheets

FLUID DISPENSING SUBASSEMBLY WITH POLYMER LAYER

BACKGROUND

Some fluid dispensing assemblies use transducers or actuator to cause the system to dispense fluid. The actuators may be piezoelectric actuators, microelectromechanical (MEMS) actuators, thermomechanical actuators, thermal phase change actuators, etc. The actuators generally cause some sort of interface with the fluid to move to generate pressure in the fluid that in turn causes the fluid to move through an aperture to a receiving substrate.

Improvements in the efficiency of an electromechanical actuator to displace fluid provide design flexibility for the fluid dispensing assembly. The efficiency improvements permit a new balance between smaller actuators, lower voltage operation and larger drop mass.

One example of such a fluid dispensing system is an ink jet printer. Generally, ink jet printers include some sort of transducer or actuator that cause the ink to move out of the print head through a jet, nozzle or other orifice to form a drop on a print surface.

DETAILED DESCRIPTION OF THE EMBODIMENTS

Some fluid dispensing assemblies include a local ink supply and a fluid dispensing subassembly. The fluid dispensing subassembly may be viewed as having several components. First, the driver component may consist of the transducer, such as a piezoelectric transducer, that causes the fluid to exit the subassembly, the diaphragm upon which the transducer operates, and the body plate or plates that form the pressure chamber. Second, an inlet component consists of the manifold body that directs the fluid from the manifold toward the pressure chamber. Next, the outlet component directs the fluid from the pressure chamber to the aperture. Finally, the aperture itself dispenses fluid out of the fluid dispensing subassembly.

One example of a fluid dispensing subassembly is a jet stack in a printhead, the jet stack typically consisting of a set of plates bonded together. In this example, the driver would operate to cause the fluid to exit the jet stack through the aperture plate. The inlet would direct the fluid from the manifold towards the pressure chamber, and the outlet would direct the ink from the pressure chamber to the aperture plate. In the example of a jet stack, the aperture would dispense fluid out of the jet stack and ultimately out of the print head.

Figure 1:
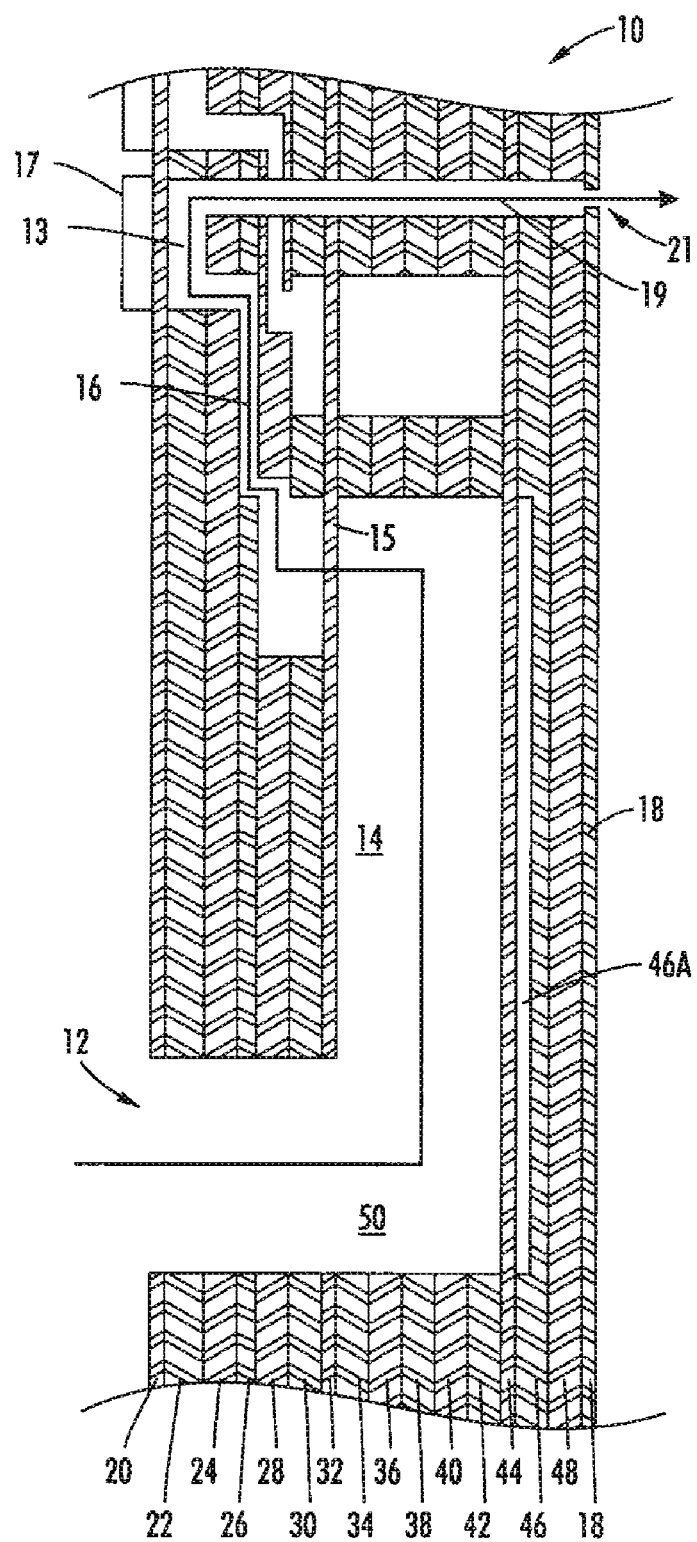
FIG. 1 shows an example of a fluid dispensing subassembly made of a fully brazed set of steel plates.

FIG. 1 shows an example of a jet stack in a printhead. The jet stack 10 consists of a set of plates bonded together in this example and will be used in the discussion. It should be noted that this is just an example and no limitation to application or implementations of the invention claimed here. As will be discussed further, the terms 'printer' and 'printhead' may consist of any system and structure within that system that dispenses fluid for any purpose. Similarly, while a jet stack will be discussed here to aid in understanding, any fluid dispensing subassembly may be relevant. The fluid dispensing subassembly or fluid dispensing body may be comprised of a set of plates, as discussed here, a molded body that has the appropriate channels, transducers, and apertures, a machined body, etc. As aspects of the embodiments include additional structures inside the jet stack than just the plates, the set of plates may be referred to as the fluid dispensing body within the fluid dispensing subassembly.

The jet stack receives ink from a reservoir (not shown) through a port 12. The ink flows through the manifold 14 having a compliant wall 44 and an air space 46A opposite the manifold, through a particle filter 15 and into to an inlet 16. The inlet directs liquid to a pressure chamber 13. When an actuator or transducer 17 activates, it causes the diaphragm plate 20 to deflect, and causes ink to flow through the outlet 19 and exit an aperture 21 on the aperture plate 18. The ink drops exiting the aperture form a portion of a printed image. The part of the ink path that includes the inlet, the pressure chamber, actuator, outlet, and aperture is referred to as the "single jet".

The series or set of plates are etched, stamped or otherwise manufactured to form the various channels, chambers and features of the jet stack. In this example, the stack consists of a diaphragm plate 20; body plate 22; a separator plate 24; an inlet plate 26; separator plates 28 and 30; a particle filter plate 32; and manifold plates 34, 36, 38, 40, and 42 forming manifold 50; a compliant wall plate 44, a plate 46 providing an air space adjacent to the compliant wall, an aperture brace 48 and an aperture plate 18.

When the jet stack is made up from a series of bonded metal plates, a thin, stainless steel diaphragm plate 20 is brazed to the body plate 22. The junction between the brazed plates is a rigid bond so that the diaphragm flexure during actuation is concentrated completely inside the area of the body 13. Some brazing processes include gold-plating of all of the plates of the jet stack prior to brazing, adding substantial cost to the plates.

Current trends in print head and other fluid dispensing assembly design call for an increase in the number of jets or apertures per unit area. This high packing density forces a decrease in size of the actuators for each jet. The reduction in size of the actuator reduces the displacement volume by the actuator per applied volt, which is a measure of actuator efficiency. This in turn increases the drive voltage needed to achieve a particular drop mass or drop velocity because more voltage is needed to obtain the needed displacement of the actuator. This increased voltage may have negative effects.

Some of these negative effects include increasing the cost of the integrated circuits used to drive the actuators due to an increase in the required maximum voltage/power rating; reliability risks associated with increasing the field strengths applied to the actuators; and ultimately limit the potential throughput of the jets as the upper voltage limits of the drive electronics and acceptable field strengths are reached.

Further, new jet stack designs incorporate adhesively bonded layers to attach brazed sub-stacks. This reduces the number of plates to be gold-plated, as the sub-stacks are brazed and then connected together, instead of all of them being brazed at once. The use of adhesive layers has eliminated some surfaces having to be plated and introduced new compliant members into the stack. Examples of these approaches are demonstrated in U.S. patent Ser. No. 12/194, 456, "Fluid Dispensing Subassembly with Compliant Aperture Plate;" Ser. No. 12/194,472, "External Fluid Manifold with External Compliant Wall;" Ser. No. 12/194,488, "Fluid Reservoir with Compliant Wall;" and 12/194,494, "Fluid Dispensing Subassembly with Compliant Film;" all filed on Aug. 19, 2008.

However, none of the approaches referenced above have addressed the use of an adhesive bond layer between the diaphragm and body plate. This interface is an important component of the actuator, and directly impacts the displacement efficiency and operational frequency of the actuator. By using an appropriately chosen adhesive bond layer component, the displacement efficiency of the driver can be improved. In addition, using an adhesive bond layer between the diaphragm and body plate may allow elimination of any brazing processes needed in the formation of the jet stack. This would reduce costs and possibly allow more freedom in the design realm and possibly allow more automation in the process.

Figure 2:
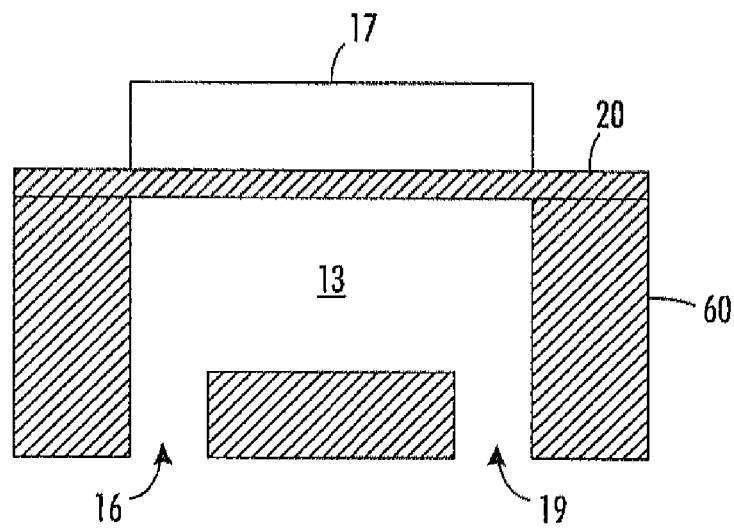
FIG. 2 shows a side view of a portion of a fluid dispensing subassembly.

FIG. 2 shows a side view of a portion 60 of a jet stack such as 10 from FIG. 1. The portion includes the body pressure chamber 13, the inlet 16, the outlet 19, the actuator 17, and the diaphragm 20. In a typical operation, the actuator 17 operates in a first direction to 'pull' the diaphragm 20 to increase the volume of the pressure chamber 13. This causes ink to enter the chamber from the inlet 16. The actuator 17 then operates in the opposite manner to push on the chamber, causing the ink to flow out the outlet 19 ultimately causing a drop of fluid to be ejected from the aperture of the fluid dispensing device. As shown here, the diaphragm rests directly on the plates of the jet stack portion 60.

The fluid dispensing subassembly shown here is a portion of the jet stack, the diaphragm and the actuator. The fluid dispensing subassembly may have a local fluid reservoir for each aperture, also called a nozzle or a jet, formed from some portion of the fluid dispensing subassembly layers. The term layer here may mean a plate, such as those that are to be brazed as discussed above, or a polymer layer, as set out in the patent applications mentioned above. The jet stack portion 60 may consist of plates, polymer films or a mixture of both. Therefore, the body pressure chamber/local reservoir may be referred to as being formed out of the 'layers' of a portion of the fluid dispensing subassembly.

Figure 3:
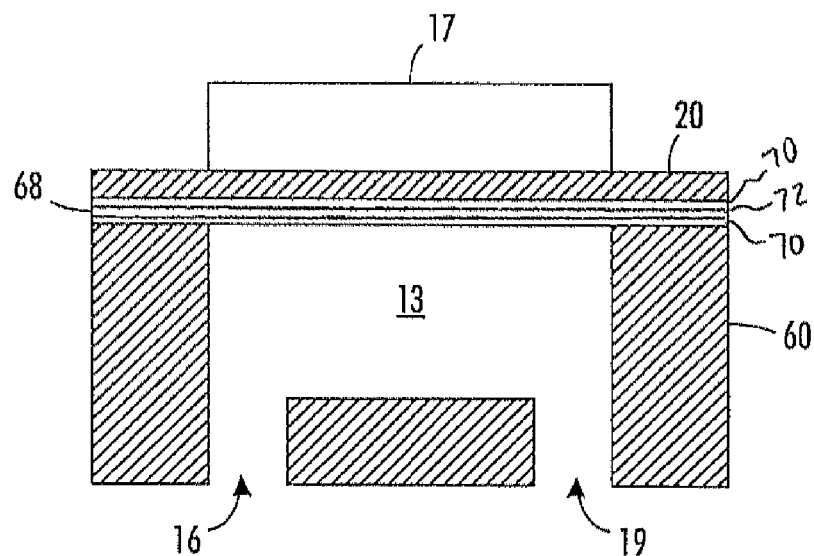
FIG. 3 shows a side view of a portion of a fluid dispensing subassembly having an adhesively attached diaphragm.

FIG. 3 shows a side view of a portion 60 of a jet stack having a polymer layer 68 between the diaphragm 20 and the jet stack portion 60. The layer 68 may be relatively thin, having a thickness of less than 50 microns. The layer 68 may also be relatively soft, having a modulus that is less than 10 GigaPascals. The polymer layer 68 may also act as an adhesive layer that functionally bonds the diaphragm to the body plate or portion of the jet stack/fluid dispensing subassembly. The side of the portion of the jet stack to which the polymer layer is attached may be referred to here as the body chamber side.

Figure 4:
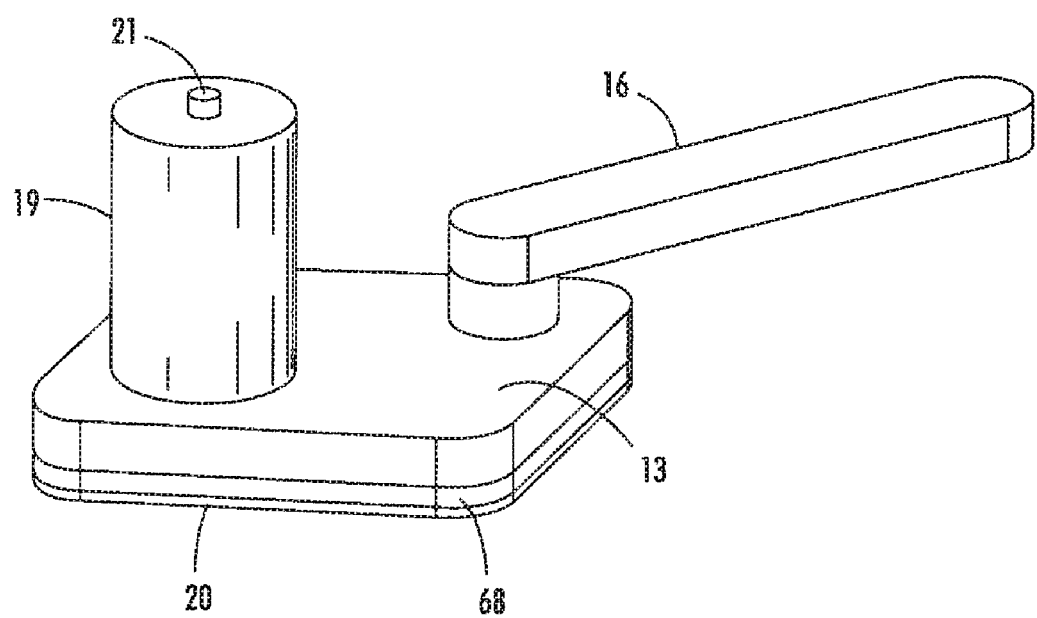
FIG. 4 shows an embodiment of a single jet of a fluid dispensing subassembly having an adhesively attached diaphragm.

FIG. 4 shows an alternative view of the jet stack, this view being of a single jet. The single jet has a body pressure chamber 13, an inlet 16 that feeds ink into the pressure chamber, and an outlet 19 that directs the ink to the aperture 21. The diaphragm 20 attaches to the body chamber 13 through the polymer layer 68, either acting as the adhesive or using a separate adhesive.

The attachment of the diaphragm 20 to the body chamber 13 lies at an important juncture of the actuator. The polymer layer needs to have adequate flexibility to provide flexure that extends outside the body walls, consequently increasing the volumetric displacement of the diaphragm compared to a brazed diaphragm where the attachment to the body plate is rigid. Excessive compliance that could result from too thick a polymer layer or too soft a polymer will lead to reduced efficiency because the flexible attachment will not support the pressurization of the body chamber. Excessive compliance may also lead to an unacceptable reduction in drop generator operating frequency due to reduction in driver natural frequency.

The materials available include a wide range of possibilities, including a tape having a thermoset polyimide core 72 and relatively thin thermoplastic layers 70 on each side, shown in FIG. 3. Polyetherether ketone may be used as a single thermoplastic adhesive layer. Other thermoplastics such as polysulfone, polyethersulfone, polyphenylene sulfide, polyether imide, polyester may be used as the core of a double-sided tape or as thermoplastic adhesives. Thermoset adhesives such as epoxy, bismaleimide, polyimide, acrylic, cyanoacrylate, phenolic, silicone, etc. may be used directly as a single layer bond between the diaphragm and body or can be used as the adhesives in a multilayer tape with a thermoset or thermoplastic core.

In an experiment, control print heads were made with jet stacks comprised of stainless steel jet stack plates bonded and brazed together to form a monolithic jet stack structure. Test print heads were made with jet stacks having all plates, except the diaphragm, bonded and brazed together. The diaphragms of the test parts were then adhesively attached to the back side of the jet stack using a polymer adhesive. The remaining portions of the print heads were assembled in accordance with their usual processes.

Once assembled, the print heads were tested to determine the actuator drive voltage that was needed to obtain the required drop mass and velocity. The results showed that the print heads with the diaphragm attached using the polymer used 10% less voltage on average than the control print heads.

The fluid dispensing subassembly portion 60 would be manufactured from plates or a mix of plates and compliant films. The polymer layer 68 would then be attached to the portion 60 using an adhesive, or would be an adhesive itself. The diaphragm 20 would then be attached to the adhesive and then the actuator array would be attached.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A fluid dispensing subassembly, comprising:
   a diaphragm arranged to be operated on by a transducer;
   a body pressure chamber arranged to be operated on by the diaphragm; and
   an adhesive attachment layer arranged between the diaphragm and the body pressure chamber, the adhesive layer comprises a tape having a polymer core and thin adhesive layers on each side of the polymer core.

2. The fluid dispensing subassembly of claim 1, wherein the body pressure chamber is formed from either a single plate or set of plates bonded together.

3. The fluid dispensing subassembly of claim 1, wherein the diaphragm comprises a sheet of either metal or ceramic.

4. The fluid dispensing subassembly of claim 3 wherein the metal is selected from a group consisting of: steel, aluminum, nickel, brass, bronze, titanium, and copper.

5. The fluid dispensing subassembly of claim 3 wherein the ceramic is either alumina or silica.

6. The fluid dispensing subassembly of claim 1 wherein the adhesive layer is a thermoset adhesive selected from the group consisting of: epoxy, bismaleimide, polyimide, acrylic, cyanoacrylate, phenolic, and silicone.

7. The fluid dispensing subassembly of claim 1, wherein the adhesive layer is a thermoplastic adhesive selected from the group consisting of: polyimide, polyester, polyetheretherketone, polysulfone, polyethersulfone, polyphenylene sulfide, and polyetherimide.

8. The fluid dispensing subassembly of claim 1 where the core of the double sided tape is selected from the group consisting of: polyimide, polyester, polyetheretherketone, polysulfone, polyethersulfone, polyphenylene sulfide, and polyetherimide.

9. The fluid dispensing subassembly of claim 1 wherein the adhesive outer layers comprise one or more of polyetheretherketone, epoxy, bismaleimide, polyimide, acrylic, cyanoacrylate, phenolic, silicone, polysulfone, polyethersulfone, polyphenylene sulfide, or polyetherimide.

10. A fluid dispensing subassembly, comprising:
a body pressure chamber formed of either a single plate or set of plates;
a diaphragm arranged to operate on the body pressure chamber; and
an adhesive layer arranged between the body pressure chamber and the diaphragm, the adhesive layer comprises a tape having a polymer core and thin adhesive layers on each side of the polymer core.

11. The fluid dispensing subassembly of claim 10, wherein the set of plates comprise a set of metal plates brazed together.

12. The fluid dispensing subassembly of claim 10, wherein the fluid dispensing subassembly is a jet stack of a printer.

13. The fluid dispensing subassembly of claim 10, wherein the set of plates includes an aperture plate having an aperture through which fluid is dispensed.

* * * * *